United States Patent [19]

Chao et al.

[11] Patent Number: 4,911,233
[45] Date of Patent: Mar. 27, 1990

[54] INTERFACE FLUID HEAT TRANSFER SYSTEM

[76] Inventors: James C. Chao, 8 Ellsworth Dr., Warren, N.J. 07060; Tzer-Fen Chen, 40 Arthur Pl., Iselin, N.J. 08830

[21] Appl. No.: 234,582

[22] Filed: Aug. 22, 1988

[51] Int. Cl.$^4$ .............................................. F28B 3/02
[52] U.S. Cl. ...................... 165/111; 55/240; 55/267; 126/299 E; 165/907; 165/913; 165/134.1; 261/104; 261/153; 261/154
[58] Field of Search ............ 165/111, 907, 913, 134.1; 126/299 R, 299 E; 261/104, 157, 153, 154; 55/233, 240, DIG. 36, 267

[56] References Cited

U.S. PATENT DOCUMENTS

| | | | |
|---|---|---|---|
| 3,420,069 | 1/1969 | Booth | 165/907 |
| 3,786,739 | 1/1974 | Wright | 126/299 E |
| 3,802,158 | 4/1974 | Ohle | 126/299 E |
| 4,351,652 | 9/1982 | Wisting | 126/299 E |
| 4,363,642 | 12/1982 | Stahl | 126/299 E |
| 4,753,218 | 6/1988 | Potter | 55/240 |

FOREIGN PATENT DOCUMENTS 2555070 11/1983 France .

Primary Examiner—Albert W. Davis, Jr.
Attorney, Agent, or Firm—Fred A. Wilson

[57] ABSTRACT

A process for condensing vapor or mist material onto a thin first liquid film surface, which liquid film is generated and supported on the outer surface of a porous structure. A moving condensable vapor contacts the thin liquid film and is condensed onto the liquid surface. The condensed vapor drains by gravity action into a collection zone, together with a portion of the liquid film material being entrained therein. The vapor or mist material can be either substantially immiscible or miscible in the liquid film. The first liquid is preferably provided in a closed system and is recycled at near ambient temperature and at pressure conditions sufficient to produce the thin liquid film external to the porous structure, which has a porosity of 20-80%. An apparatus including the porous structure and liquid handling system for condensing an upflowing condensable vapor is disclosed.

20 Claims, 2 Drawing Sheets

INTERFACE FLUID HEAT TRANSFER SYSTEM

BACKGROUND OF THE INVENTION

This invention pertains to condensing mists and vapors onto the surface of a thin layer liquid film. It pertains particularly to a process for condensing hot flowing organic vapors onto a thin film of a hydrophilic liquid system supported on an exposed surface of a porous structure, and more particularly for condensing cooking oil vapors onto a thin film of water, and includes apparatus for achieving the vapor condensing process.

Condensing vapors onto the outer surface of heat exchanger surfaces or tubes is well known, such as used for condensing water vapor or steam from a turbine exhaust onto tubular surfaces of water-cooled heat exchangers to produce condensate for reheating and reuse. For such applications, the steam vapor is at a low subatmospheric pressure and the cooling water flowing through the impermeable tubes is at superatmospheric pressure such as 15–30 psig. Also, in some distillation processes a rising vapor is condensed against a cooler fluid within tubes of a heat exchanger. However, these known processes for condensing heated rising mists or vapors are not entirely satisfactory because the surfaces and the condenser are likely to become contaminated by the vapor, consequently the heat exchange will be altered. Moreover, direct contact of a mist or vapor with a liquid which is either miscible or immiscible provides better and more effective heat exchange than indirect heat exchange.

SUMMARY OF INVENTION

This invention provides a process and system for condensing a flowing condensable vapor or mist material by contacting it with a thin film of a cooler first liquid. The first liquid film is provided and maintained on the exposed surface of a porous structure by capillary and surface tension forces of the liquid, and is oriented so as to have a downward force component to provide for only minor liquid drainage from the film. After the vapor or mist has been condensed on the first liquid film, the resulting condensate second liquid along with a portion of the first liquid forming the thin liquid film will be continuously drained away for further processing or disposal as desired. Any loss of liquid from the first liquid film will be immediately replenished from the first liquid source.

The condensable vapor or mist material can be either a single component or a multi-component mixture. The first liquid can be either a single component or a multi-component solution. Also, the vapor can be either substantially immiscible with the liquid film, or alternatively it can be miscible in or with the liquid film. The porous structure has controlled porosity of about 20–80% and preferably has 40–70% porosity, and the structure has pore sizes within the range of 0.01–200 microns. The porous structure outer surface and the liquid film thereon are oriented at an angle of 0°–75° with a vertical plane, and the structure is usually provided by one or more porous metal tubes. However, porous ceramic, glass, metal or polymer structures, or any combination of the above materials in single or multi-layer construction having the desired porosity and pore sizes can also be used. The first liquid can be provided by either an open system or by a closed pressurizable liquid supply system, and is operable at temperature between its freezing and boiling temperatures. For an open liquid supply system the liquid pressure will be substantially atmospheric pressure, but for a closed liquid supply system the liquid pressure will be 0–15 psig pressure.

In the immiscible fluid system, cooling and condensation of the flowing mist or vapor mainly occurs. The condensable vapor is usually a hot cooking oil vapor or mist which rises upwardly from a heating step, such as cooking oil vapor arising from a food deep frying operation. The liquid film can be water or a hydrophilic liquid including glycols, glycerols and organic liquids which passes through the porous structure at near ambient temperature by the combined effect of a small positive differential pressure and capillary action of the first liquid within the pores of the porous structure to form the liquid film thereon.

The liquid film is preferably water which has a temperature between about 2° and 80° C. water temperature usually being preferred. The first liquid pressure is usually at least atmospheric pressure, with 0–15 psig pressure over the vapor pressure being preferred. Condensable vapors which can be used for this invention include cooking oils, such as animal fats including butter and lard and vegetable oils such as coconut oil, corn oil, olive oil, peanut oil, soybean oil, and mixtures thereof. Although the thin film of first liquid is preferably substantially stagnant, and provides a weight ratio of the first liquid to vapor condensate of at least about 0.5/1.0, the invention also provides for increased flows of the first liquid up to a weight ratio of first liquid film to vapor condensate about 10/1, particularly when the condensable vapor is at least partly miscible in the first liquid film.

In the miscible fluid system, the vapor or mist material being condensed by the thin film of the first liquid is at least partly miscible in the first liquid forming the film. Thus the liquid film provides an extended surface area which facilitates condensation of the mist or vapor together with some mass exchange between the condensing vapor and first liquid.

This invention advantageously provides a process and apparatus for conveniently and safely condensing hot mists and vapors, such as cooking oil vapors rising from open cooking operations, onto a thin uniform film of a cooler liquid such as water, and then draining away the condensed vapor together with a minor portion of the liquid film. Thus, because the condensing vapor does not contact the porous structure surface, the surface is kept clean and generally maintenance free. Usually only a minor amount of the first liquid producing the thin liquid film will be consumed or used in the process, but increased amounts of the first liquid can be used if desired.

BRIEF DESCRIPTION OF DRAWINGS

This invention will be further described with reference to the following drawings, in which.

DESCRIPTION OF INVENTION

Figure 1:
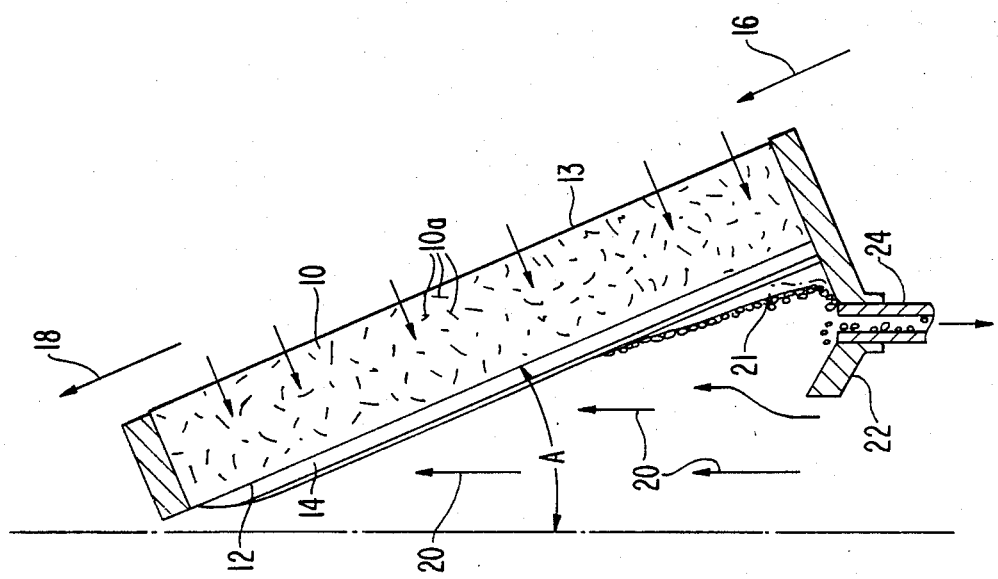
FIG. 1 is a schematic diagram showing the essential elements of the invention.

A first embodiment of the present invention is depicted by FIG. 1, in which a porous structure 10 having exposed outer surface 12 has a thin substantially uniform liquid film 14 provided on the outer surface by a flowing first liquid 16, which passes through pores 10a contained in the porous structure 10. The structure 10 has a porosity of about 20–80% and preferably 40–70% porosity. The porosity of the structure 10 is provided by the pores 10a having effective diameters of 0.01–200 microns, and preferably 0.5–100 microns. The liquid film 14 is produced by the liquid stream 16 having a small positive pressure provided on the porous structure inner surface 13 sufficient to produce a small flow of liquid through the porous structure 10, in combination with capillary forces which exist on the liquid within the porous structure 10. Any excess liquid flow at 16 not needed for generating the liquid film 14 is removed from the porous structure 10 by conduit at 18 for recycle to the system. As shown, the porous structure 10 is oriented at an angle A of 0°–75° with the vertical axis.

An upflowing condensable mist or vapor 20 contacts the uniform first liquid film 14 on outer surface 12, and the vapor is condensed thereon by the film 14 of cooler liquid. The resulting condensate second liquid 21 then flows downwardly by gravity along inclined surface 12 into a suitable receptacle 22 along with a portion of the liquid from film 14. The two liquids are both drained away through conduit(s) 24 for further processing or disposal as desired. Any loss of liquid from film 14 will be immediately replenished from liquid supply 16.

The first liquid film 14 should be maintained at least about 2° C. cooler than the rising vapor 20, and preferably should be 4°–40° C. cooler, to provide for effective condensation of the vapor by the liquid film 14. The liquid film 14 is preferably substantially stagnant, particularly when the condensable vapor 20 is substantially immiscible in the first liquid forming film 14. However if desired, the liquid film 14 can be a moving film for which the weight ratio of liquid film 14 to the vapor 20 condensed may be increased to as great as 10/1. Also if desired, the location of liquid film 14 on porous structure 10 can be reversed so that vapor 20 flow along the inner surface 13 of porous strucutre 10, with the liquid 16 being provided on the outer surface 12 of the porous structure. Furthermore, if the condensed vapor is substantially miscible in the liquid film, a larger portion of liquid film 12 is drained away with the condensed second liquid 21.

Figure 2:
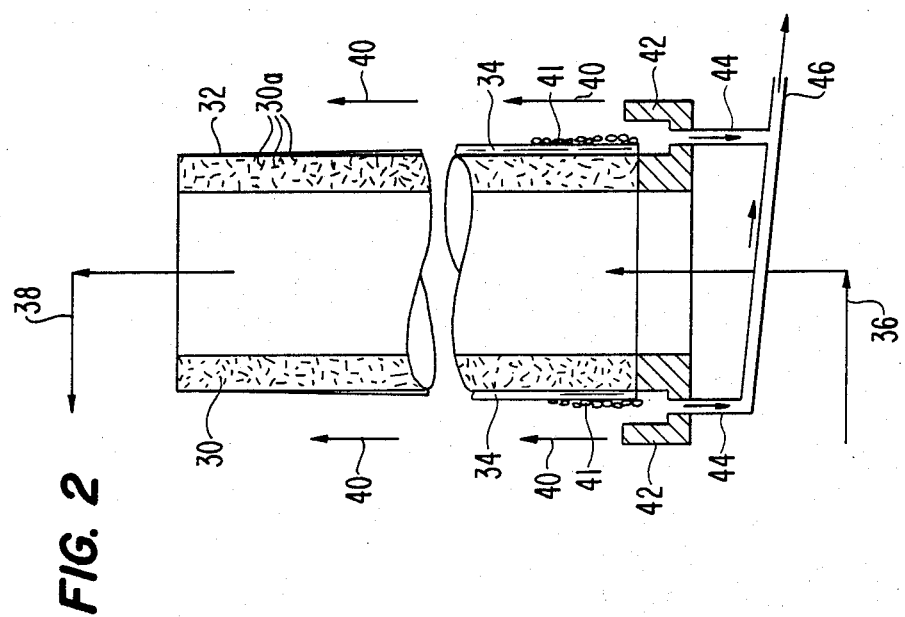
FIG. 2 is a schematic flow diagram showing a tubular embodiment of the invention.

Another preferred embodiment of the invention is shown by FIG. 2, in which the porous surface is a tubular structure 30 having exposed liquid film 34 on its exposed outer surface 32 provided by an upflowing liquid 36 within the porous tube 30. The liquid film 34 is produced by the liquid stream 36 having a small positive pressure of 0–2 psig provided on the inside of the porous tube 30, which is sufficient to produce a flow of liquid through pores 30a of the tube 30, in combination with capillary forces which occur in the liquid 36 therein. Excess liquid not used for generating and maintaining liquid film 34 is withdrawn from tube 30 as stream 38.

An upflowing mist or vapor material 40 contacts the liquid film 34 on tube outer surface 32, and is condensed thereon by the cooler liquid. The resulting condensed second liquid 41 then flows downwardly by gravity into receptacle 42 along with a portion of the first liquid from film 34. The resulting liquid mixture is drained away through conduit(s) 44 and 46 for further processing or disposal as desired. This FIG. 2 configuration is useful not only for a system in which the condensable vapor is substantially immiscible in the first liquid, but also for a system in which the condensable vapor is miscible in the first liquid.

Figure 3:
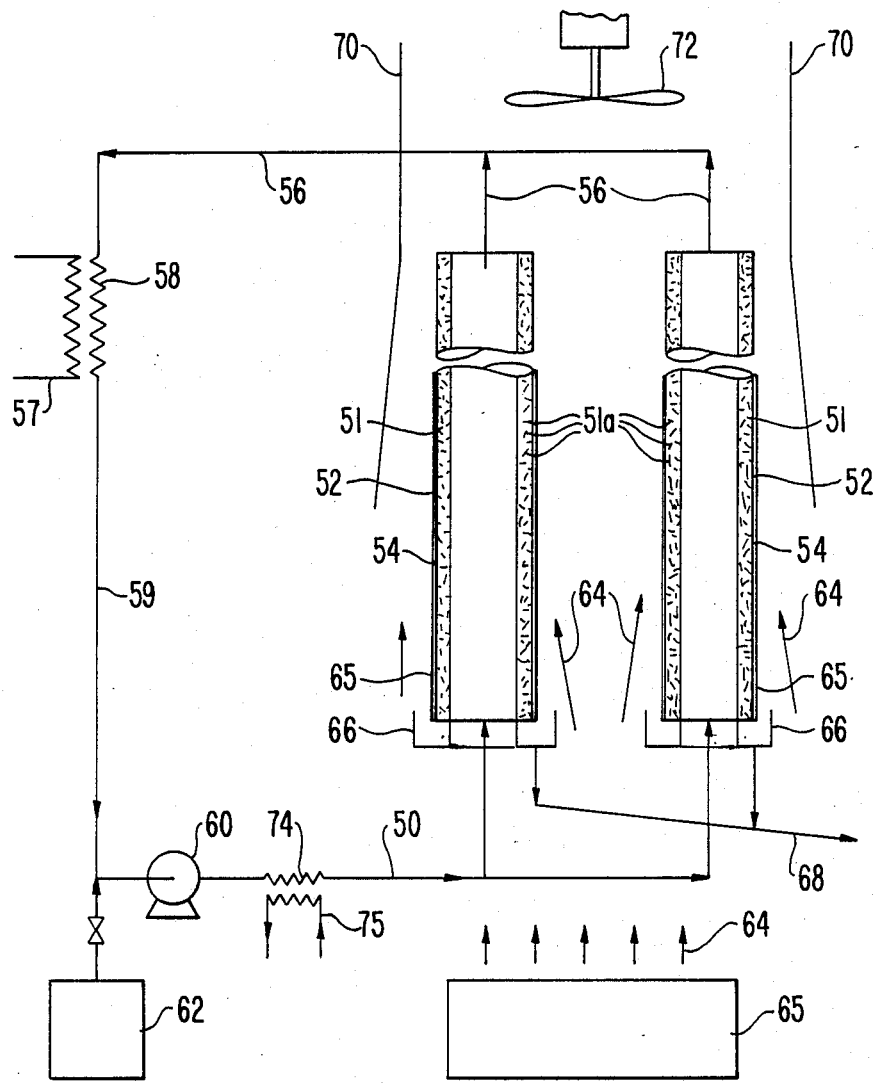
FIG. 3 is a schematic flow diagram showing a preferred embodiment of the invention, in which rising vapor is condensed against a film of liquid provided on porous tubing outer surfaces by a closed circulating system.

In another specific embodiment of the invention as shown in FIG. 3, a circulating first liquid such as water is provided at 50 and flows to the lower end of a plurality of porous metal tubes 51. The liquid 50 has a small positive pressure such as 0.5–5 psig, and a thin uniform liquid film 54 is produced on outer surfaces 52 of the porous tubes 51. Excess circulating water which does not pass outwardly through the porous tube structure 51 is withdrawn at 56, and is cooled at heat exchanger 58 against a suitable coolant liquid provided at 57. The resulting cooled liquid at 59 is recycled by pump 60 to supply the liquid stream 50. Make-up liquid is supplied as needed from reservoir 62.

A heated upflowing vapor or mist is provided at 64, such as a hot cooking oil vapor arising from a food cooking operation at 65, and the rising vapor contacts the cooler water film 54 generated on the outer surface 52 of tubes 51. The vapor 64 is condensed on water film 54 with which it is only slightly miscible, and the combined second liquid 65 is drained together with a portion of the liquid film 54 into a collector receptacle or through 66. The two mixed liquids at 65 are drained away through conduit 68, similarly as for the FIG. 2 embodiment. If desired, a duct structure 70 containing an induced draft fan 72 can be provided to effectively direct the upflowing vapor 64 past water film surfaces 54 to assure intimate contact and some mixing.

If the porous structure, such as the porous metal tubes 51, ever becomes contaminated with a build-up of condensed vapor material or oils on either the tube outer surface 52 or in the tube pores 51a, such contamination can be periodically removed by heating the circulating liquid 50 at heat exchanger 74 to an elevated temperature, such as 80°–90° C., by a heat source 75 and increasing the system pressure sufficiently to force the heated liquid 50 out through the pores 51a of the tubes 51. Following such periodic cleaning of the porous structure, operation of heat source 74 is terminated and the system returned to normal operations.

This invention will be further described by the following examples, which should not be construed as limiting the scope of the invention.

EXAMPLE 1

A vapor condensing apparatus is provided including a porous metal tube having the following characteristics:
Tube outside diameter, in.: 2,
Tube thickness, in.: 0.062,
Tube porosity, %: 50,
Pore size, microns: 5–10.

A hot cooking oil mist arising from a food cooking operation is passed upwardly around the porous tube, and water at 5 psig pressure is flowed through the tube. A small portion of the water flow passes outwardly through the porous tube wall and forms a thin substantially uniform liquid film on the tube outer surface. Important parameters for the cooking vapor and the circulating cooling water are as follows:
Average temp. of oil mist, °C.: 100,
Heat capacity of oil mist, cal/gm °C.: 0.535, Tube condensing surface area, cm$^2$: 14,000,
Average water film thickness on tube, mm: 0.01,
Cooling water inlet temp. °C.: 20,
Mass flow ratio of water/oil vapor: 1.44.

The cooking oil vapor is cooled and condensed on the cooler water film, with which it is only slightly miscible. The resulting condensate is mixed with a minor portion of the water film and both are drained away. The remaining major portion of the water flowing inside the tube is cooled to near ambient temperature and is recirculated in the system.

Although this invention has been described broadly and in terms of preferred embodiments, it is understood that modifications and variations can be made to the invention which is defined by the following claims.

We claim:

1. A process for condensing a flowing condensable vapor onto a thin film of a liquid, comprising:
   (a) providing a thin liquid film of a first liquid on an exposed surface of a porous structure, said porous structure having a porosity of about 20-80%, and being oriented at such an angle with a vertical plane that a portion of the liquid film will flow downwardly along the exposed surface of the porous structure and drip from a lowermost edge of the structure;
   (b) providing a flowing condensable vapor material contacting said liquid film, and condensing said vapor on said liquid film without contacting said porous structure so as to provide a condensate second liquid; and
   (c) draining said condensate second liquid together with a minor portion of said first liquid from the porous structure.

2. The vapor condensing process of claim 1, wherein said condensable vapor material is substantially immiscible in said first liquid.

3. The vapor condensing process of claim 2, wherein said first liquid water temperature is 2°-80° C.

4. The vapor condensing process of claim 2, wherein said condensable vapor material is an organic oil, a hydrocarbon liquid, an aqueous solution, or any combination thereof.

5. The vapor condensing process of claim 1, wherein the first liquid film is substantially stagnant on the exposed surface of said porous structure.

6. The vapor condensing process of claim 1, wherein the weight ratio of the first liquid on the condensed vapor on the porous structure is within a range of 0.5/1 to 10/1.

7. The vapor condensing process of claim 1, wherein said first liquid is recirculated and cooled to maintain the liquid film temperature below the temperature of the flowing condensable vapor material.

8. The vapor condensing process of claim 1, wherein said first liquid is provided from a closed recirculating system at 0-15 psig pressure.

9. The vapor condensing process of claim 1, wherein said porous structure is oriented at an angle of 0°-75° with a vertical plane.

10. The vapor condensing process of claim 1, wherein said porous structure has a porosity of 40-70%.

11. The vapor condensing process of claim 1, wherein said vapor material is substantially miscible in said first liquid.

12. The vapor condensing process of claim 1, wherein said first liquid is periodically heated to a temperature at least about 80° C. to liquefy and remove vapor condensate deposits from said porous structure and from pores within said porous structure 13. A process for condensing a flowing condensable vapor material into a thin film of a liquid, comprising:
   (a) providing a thin liquid film of a first liquid at 2°-80° C. temperature on an exposed outer surface of a porous structure having the outer surface orientedvertically at 0°-75° C. with a vertical plane, said structure having a porosity of 40-70%;
   (b) providing a flowing condensable cooking oil vapor material contacting said liquid film, and condensing said vapor on said liquid film without contacting said porous structure so as to provide a condensate second liquid, sand condensate liquid being substantially immiscible with said liquid film; and
   (c) draining said condensate liquid together with only a minor portion of said first liquid from the porous structure.

14. An apparatus adapted for condensing a flowing condensable vapor onto a thin film of a liquid, comprising:
   (a) a porous structure having at least one exposed surface which is oriented at an angle less than 80° with a vertical plane and has a porosity of 20-80%;
   (b) a thin film of liquid maintained on said exposed surface of said porous structure;
   (c) an upflowing vapor material contacting said liquid film without contacting said porous structure, so than the vapor is condensed on the liquid film and drains downwardly therefrom; and
   (d) a collection means located below said porous structure and thin film of liquid, so as to collect and drain away the condensed vapor together with a portion of liquid from said liquid film.

15. The apparatus of claim 14, wherein said porous structure has a porosity of about 40-70% and has pore sizes within a range of 0.01-200 microns.

16. The apparatus of claim 14, wherein said porous structure is made of ceramic, glass, metal, or polymer material or any combination thereof.

17. The apparatus of claim 14, wherein said porous structure comprises a plurality of porous tubes.

18. The apparatus of claim 14, wherein said liquid film is maintained by a circulating liquid system including a heat exchange surface for cooling the circulating liquid.

19. The apparatus of claim 14, wherein said liquid film is maintained by a circulating liquid system including a heat exchange means provided upstream of the porous structure for periodically heating the circulating liquid and porous structure to an elevated temperature.

20. An apparatus adapted for condensing a flowing condensable vapor onto a thin film of a liquid, comprising:
   (a) a porous structure having at least one exposed outer surface which is oriented at an angle of 0°-75° with a vertical plane, said porous structure formed of at least one porous metal tube having a porosity of 40-70%.
   (b) a thin film of liquid maintained on said exposed outer surface of the porous structure, said liquid film being maintained by a liquid circulation system;
   (c) an upflowing vapor material contacting said liquid film without contacting said porous structure, so that the vapor is condensed on the liquid film and drains downwardly therefrom; and
   (d) a collection means located below said porous structure and thin film of liquid, so as to collect and drain away the condensed vapor together with a portion of liquid from said liquid film.

* * * * *